United States Patent [19]

Schneider

[11] 3,860,751

[45] Jan. 14, 1975

[54] METHOD AND ARRANGEMENT FOR COMPENSATING FOR STRAY LIGHT EFFECTS IN TELEVISION CAMERAS

[75] Inventor: Hans-Dieter Schneider, Gross-Gerau, Germany

[73] Assignee: Robert Bosch Fernsehanlagen GmbH, Darmstadt, Germany

[22] Filed: Nov. 6, 1973

[21] Appl. No.: 413,227

[30] Foreign Application Priority Data

Nov. 10, 1972 Germany ............................ 2255027

[52] U.S. Cl. ............................ 178/7.2, 178/DIG. 26

[51] Int. Cl. ............................................. H04n 5/16

[58] Field of Search ............... 178/7.1, 7.2, DIG. 26, 178/DIG. 29, DIG. 42

[56] References Cited

UNITED STATES PATENTS 3,621,132 11/1971 Page .................................... 178/7.2

*Primary Examiner*—Robert L. Richardson

*Attorney, Agent, or Firm*—Michael S. Striker

[57] ABSTRACT

Scanning of the storage electrode by the electron beam of a television camera results in the furnishing of television signals having a first portion within a desired signal range and a second portion in an overdrive signal range. The two signal portions are separated by an amplitude discriminator and a first and second compensation signal corresponding to the average value of the signal within the desired signal range and within the overdrive signal range respectively are applied to the clamping circuit which sets the black level. The black level setting thus varies as a function of the average signal strength in both the overdrive and the desired signal range.

10 Claims, 2 Drawing Figures

PATENTED JAN 14 1975 3,860,751

METHOD AND ARRANGEMENT FOR COMPENSATING FOR STRAY LIGHT EFFECTS IN TELEVISION CAMERAS

BACKGROUND OF THE INVENTION

This invention relates to a method and system for compensating for stray light effects in television cameras. In particular it relates to such compensation in color television cameras wherein the pickup tube has a storage electrode which may be charged photoelectrically to values exceeding a charge required for a television signal having a desired signal range. In this type of camera the charge accumulated on the storage electrode is discharged by the electron beam during blanking intervals.

The optical system in a television camera tends to generate stray light which, generally, has a substantially level spectral distribution. The presence of this light tends to decrease the contrast in the television picture, that is dark portions are considerably lightened. Where color cameras are concerned, the stray light has an additional component which is generated by reflections within the storage electrode of the pickup tube. This results from the fact that the storage electrode is not black but, for example in a pickup tube of the plumbicon type is of a reddish brown color.

When the scene to be reproduced has a neutral color distribution, the black level in the red channel is increased by about 30 percent by this stray light, that in the green channel by about 10 percent and that in the blue channel by about 5 percent. Dark portions in color neutral portions of the picture tend to have a red cast which increases with increasing light coming through the objective, that is with increases in the average value of the signal at the output of the TV pickup tube. Thus the average value of the signal can serve as a good control value with which the compensation of the stray light can be effected, that is a change in the black level can be effected by use of the average value of the output signal of the pickup tube to compensate for such stray light effects.

However this method has the disadvantage that when the characteristic curve of the pickup tube has been crossed, that is for partial overexposure, the signal is limited in the amplifier stages. In this case the proportionality between the light current (and therefore the stray light) and the average value of the signal no longer obtains, therefore causing the compensation to be ineffective. Thus, with increasing overdrive the dark portions of the picture tend again to have a red case causing the picture to be unusable.

The partial over-illumination or over-exposure which results from highlights causes a very high charge to be accumulated on the corresponding places on the storage electrode. Generally speaking, a single pass of the electron beam is not sufficient to neutralize the charge resulting from such highlights and several passes of the electron beam are required. Thus, the screen tends to show a so-called "comet trail" in the case of moving objects and a "blooming" of these highlight portions when stationary objects are concerned. To suppress these effects the electron beam in such cameras is not suppressed during the retrace intervals, but is greatly increased so that these large charge accumulations are discharged to just above the desired signal range. The excess charge is thus transformed into electrical signals during the retrace intervals. Thus a portion of the signal exists which is proportional to the amount of stray light. This signal is not transmitted by the camera but does have undesired effects on the black level in the desired signal range.

SUMMARY OF THE INVENTION

It is an object of the present invention to furnish a method and arrangement for compensating for stray light effects even for such television cameras wherein the electron beam is active during the retrace intervals, without, however, adversely affecting the black level of the output signal.

The present invention is thus a method for compensating for stray light in the optical system of a television camera having a storage electrode and an electron beam, wherein charge accumulated photoelectrically on said storage electrode generates a television signal having a first portion within a desired signal range and a second portion in an overdrive signal range upon scanning by said electron beam. Further, in such television cameras, the electron beam discharges said storage electrode to charges corresponding to said desired signal range during blanking intervals and the television camera has clamping circuits for clamping the black level of the television signal to a determined level. The method of the present invention comprises the steps of creating a first compensation signal varying as a function of a determined characteristic of said first portion of said television signal. Creating a second compensation signal varying as a function of a determined characteristic of said second portion of said television signal. First and second compensation signals are applied to the black level clamping circuit of the camera, for varying said black level as a function of both said first and second compensation signals.

The advantage of the method and arrangement of the present invention is, that the color error in the dark portions of the picture are reliably eliminated even for highlights where the light current exceeds the current in the desired operating range.

It is possible that, when the compensation for stray light is carried out by controlling the black level so as to oppose the change in the television signal occurring because of the stray light, that the error is transferred into the white region of the television signal. This is particularly the case when excess lighting is particularly high. Thus, in a further preferred embodiment of the present invention, the additional error which may be expressed as a change in the amplification factor, is compensated for by a corresponding opposite control of the gain of the amplifiers through which the television signal passes.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
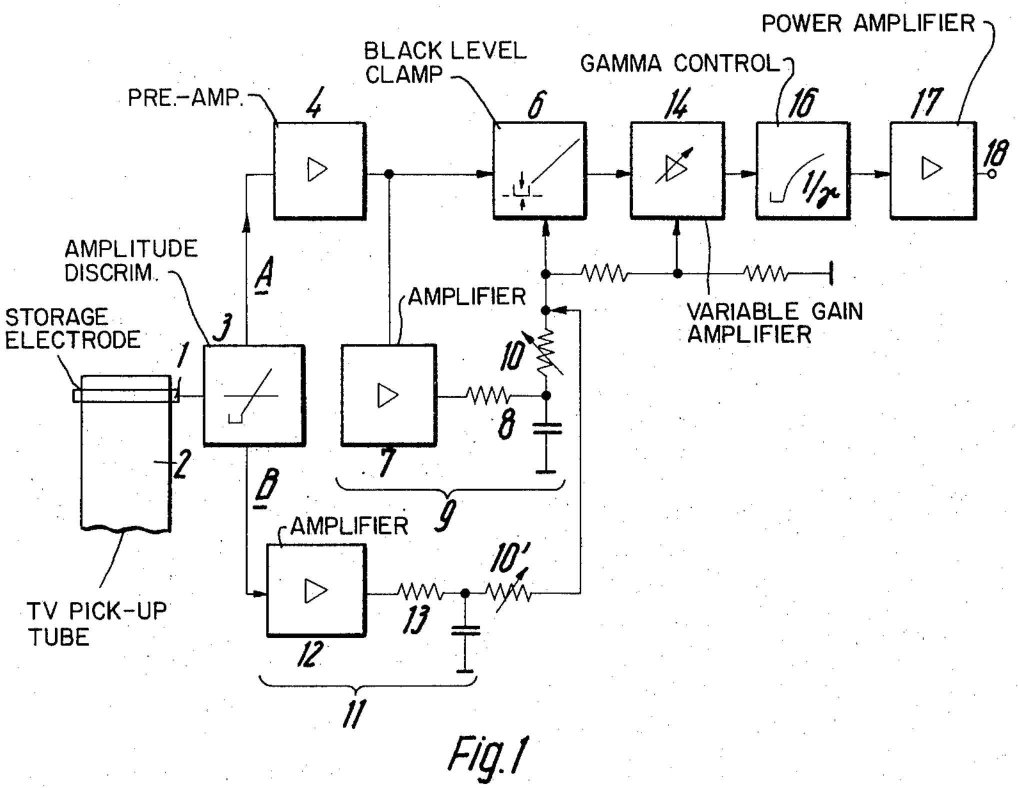
FIG. 1 is a block diagram of the system of the present invention.

A preferred embodiment of the present invention will now be described with reference to the drawing.

Figure 2:
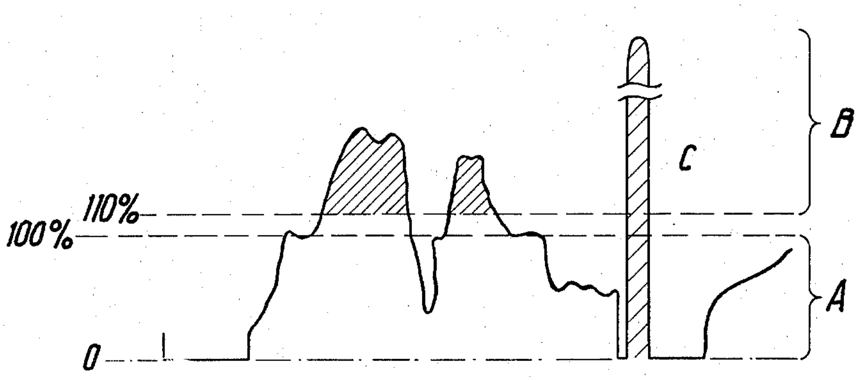
FIG. 2 is a diagram showing the signal at the output of the pickup tube.

The signal or storage electrode 1 of the television pickup tube 2 furnishes a signal which is shown in FIG. 2, that is a signal which has a first portion labelled A which is within a desired signal range and a second portion, labelled B, which is in the overdrive signal range. Those signal portions which are in the overdrive signal range and which are indicated as shaded portions in FIG. 2 are scanned by the electron beam during the retrace interval, the amplitude of the signal C during this retrace interval being determined by the trace/retrace time ratio.

The signal from electrode 1 is applied to a level selection stage 3 (amplitude discriminator stage). There the signal is divided into signal portions A and B. The signal portion A, which is the signal portion which is the desired operating signal, is applied via a preamplifier 4 to a black level regulator stage 6 which fixes the black level of the signal. Further, the amplified portion A of the television signal is applied to first compensation signal furnishing means indicated by reference numeral 9 in the Figure which comprise an amplifier 7 and an integrating circuit having a capacitor 8 and a variable resistor 10 connected to the output of amplifier 7. The first compensation signal furnishing means, in a preferred embodiment of the present invention, furnish a signal which is substantially equal to the average value of the signal in the desired signal range. The amplitude of this first compensation signal can of course be adjusted by adjusting variable resistor 10. The first compensation signal, namely the signal at the terminal of resistor 10 which is not connected to capacitor 8 is applied to the control input of the black level clamping circuit means, here indicated as a black level clamping stage 6. The amplitude of the first compensation signal is of course so adjusted that the effect of the compensation signal just compensates for the stray light effects. The clamping circuit means 6 are a typical black level clamping circuit such as is shown, for example, in U.S. Pat. No. 3,085,131 to Diehl. Resistor 10 would be connected to the common point of resistors R2 and R3 in the single FIGURE of the Diehl patent, to replace the fixed voltage −E′ applied at that terminal according to Diehl.

The second output of the amplitude discriminator stage 3 furnishes the signal portion B. This output of the amplitude discriminator stage is connected to the input of second compensation signal furnishing means 11, which comprise an amplifier 12 and integrator circuit means including a capacitor 13 and a variable resistor 10′. This signal also is connected to the control input of the black level clamping circuit 6, with an amplitude adjusted in such a manner that the second compensation signal just compensates for the effective stray light on the overdrive signal portions.

It is of course possible that the black level regulation which takes place in stage 6 as a function of the first and second compensation signal causes a corresponding change in the white level. In order to compensate for this, a portion of the compensating signals is applied to the gain control input of a variable gain amplifier 14. This tends to keep the white level of the television signal constant, irrespective of the changes in the black level. The output of the variable gain amplifier 14 as applied to the input of a standard gamma control stage 16 which in turn is connected to the input of the final power amplifier 17 of the television camera. The television signal with stray light compensation is then available at the output terminal 18 of the television camera.

While the invention has been illustrated and described as embodied in circuitry for deriving a first and second compensation signal, it is not intended to be limited to the details shown, since various circuit and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a television camera having an optical system, a storage electrode accumulating charge varying in part as a function of stray light in said optical system, and an electron beam for discharging said storage electrode thereby generating a TV signal, having a first portion within a desired signal range and a second portion in an overdrive signal range and wherein said electron beam discharges said storage electrode to charges corresponding to said desired signal range during blanking intervals, said television camera further having clamping circuit means for clamping the black level of said television signal to a determined level, a method for compensating for stray light in said optical system, comprising, in combination, the steps of creating a first compensation signal varying as a function of a determined characteristic of said first portion of said television signal; creating a second compensation signal varying as a function of a determined characteristic of said second portion of said television signal; and applying said first and second compensation signals to said clamping circuit means for varying said determined level as a function thereof and in a direction opposing changes in said television signal caused by said stray light.

2. A method as set forth in claim 1, wherein said first and second compensation signals are first and second compensation voltages.

3. A method as set forth in claim 1, wherein said step of creating said first compensation signal comprises separating said first and second portions of said television signal from each other; and creating said first compensation signal as a function of the average value of said first portions.

4. A method as set forth in claim 1, wherein said step of creating said first compensation signal comprises amplifying and integrating said first portion of said television signal; and wherein said step of creating said second compensation signals comprises amplifying and integrating said second portion of said television signal.

5. A method as set forth in claim 1, wherein said television camera further has a variable gain amplifier; and wherein said method further comprises the step of applying said first and second compensation signals to said variable gain amplifier in such a manner that the gain of said variable gain amplifier varies as a function thereof.

6. In a television camera having a signal electrode furnishing television signals having first portions within a desired signal range and second portions in an overdrive signal range, in combination, amplitude discriminator circuit means having an input connected to said signal electrode and having a first output for furnishing first signals corresponding to said first portions of said television signals and a second output for furnishing second signals corresponding to said second portions of said television signals; first preamplifier means having an input connected to said first output of said amplitude discriminator means and having a first preamplifier output, for amplifying said first signals and furnishing amplified first signals at said first preamplifier output; clamping circuit means having a signal input connected to said first preamplifier output, a control input, and a clamping circuit output, for clamping said first signals to a level varying as a function of signals applied at said control input; first compensation signal furnishing means having an input connected to said first preamplifier output, for furnishing first compensation signals varying as a function of said first signals at a first compensation output; second compensation signal furnishing means having an input connected to said second output of said amplitude discriminator means, for furnishing second compensation signals varying as a function of said second signals at a second compensation output; and connecting means for connecting said first and second compensation outputs to said control input of said clamping circuit means.

7. A television camera as set forth in claim 6, wherein said clamping circuit means comprise a first and second clamping circuit, each having a control input; and wherein said connecting means comprise first connecting means for connecting said first compensation output to said control input of said first clamping circuit and second connecting means for connecting said second compensation output to said control input of said second clamping circuit.

8. A television camera as set forth in claim 6, wherein said first compensation signal furnishing means comprise an amplifier, and an integrating circuit connected to the output of said amplifier.

9. A television camera as set forth in claim 6, wherein said second compensation signal furnishing means comprise an amplifier, and an integrator circuit connected to the output of said amplifier.

10. A television camera as set forth in claim 6, wherein said television camera further comprises a variable gain amplifier having a gain control input; further comprising additional connecting means for connecting said first and second compensating outputs to said gain control input of said variable amplifier.

* * * * *